(12) United States Patent
Yao et al.

(10) Patent No.: US 10,855,909 B2
(45) Date of Patent: Dec. 1, 2020

(54) METHOD AND APPARATUS FOR OBTAINING BINOCULAR PANORAMIC IMAGE, AND STORAGE MEDIUM

(71) Applicant: Tencent Technology (Shenzhen) Company Limited, Shenzhen (CN)

(72) Inventors: Li Yao, Shenzhen (CN); Juhong Wang, Shenzhen (CN); Tingting Huang, Shenzhen (CN); Xuan Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 374 days.

(21) Appl. No.: 16/041,514

(22) Filed: Jul. 20, 2018

(65) Prior Publication Data

US 2018/0332222 A1    Nov. 15, 2018

Related U.S. Application Data

(63) Continuation-in-part of application No. PCT/CN2017/094818, filed on Jul. 28, 2017.

(30) Foreign Application Priority Data

Jul. 29, 2016    (CN) .......................... 2016 1 0621487

(51) Int. Cl.
*G06K 9/68* (2006.01)
*H04N 5/232* (2006.01)
(Continued)

(52) U.S. Cl.
CPC ....... *H04N 5/232127* (2018.08); *G06T 7/593* (2017.01); *H04N 5/23238* (2013.01);
(Continued)

(58) Field of Classification Search
CPC .......... H04N 5/232127; H04N 13/271; H04N 13/239; H04N 5/23238; H04N 2013/0081;
(Continued)

(56) References Cited

U.S. PATENT DOCUMENTS

| 6,507,665 B1 * | 1/2003 | Cahill ................... G06T 3/0081 382/154 |
| 10,390,007 B1 * | 8/2019 | Chen .................... H04N 13/366 |

(Continued)

FOREIGN PATENT DOCUMENTS

| CN | 101577795 A | 11/2009 |
| CN | 103208110 A | 7/2013 |

(Continued)

OTHER PUBLICATIONS

Tencent Technology, Written Opinion, PCT/CN2017/094818, dated Sep. 28, 2017, 4 pgs.

(Continued)

*Primary Examiner* — Andrew M Moyer
(74) *Attorney, Agent, or Firm* — Morgan, Lewis & Bockius LLP

(57) ABSTRACT

A method for obtaining a binocular panoramic image is performed at an electronic apparatus. The method includes: obtaining first and second panoramic images acquired by two panoramic cameras; obtaining at least one group of a first pixel located in the first panoramic image and a second pixel located in the second panoramic image; calculating a distance between the first pixel and the second pixel in each group, and obtaining depth information corresponding to the two panoramic image according to the distance between the first pixel and the second pixel; obtaining a second monocular panoramic image through mapping by using one of the two panoramic images as a first monocular panoramic (Continued)

image, in combination with the corresponding depth information and a preset pupil distance between a first eye and a second eye; and displaying the first monocular panoramic image and the second monocular panoramic image in corresponding display regions.

20 Claims, 8 Drawing Sheets

(51) Int. Cl.
*H04N 13/271* (2018.01)
*G06T 7/593* (2017.01)
*H04N 13/239* (2018.01)
*H04N 13/00* (2018.01)

(52) U.S. Cl.
CPC ......... *H04N 13/239* (2018.05); *H04N 13/271* (2018.05); *G06T 2207/10012* (2013.01); *H04N 2013/0081* (2013.01)

(58) Field of Classification Search
CPC .......... G06T 7/593; G06T 2207/10012; G03B 37/00
USPC .......................................... 382/106, 154, 218
See application file for complete search history.

(56) References Cited

U.S. PATENT DOCUMENTS

| | | | |
|---|---|---|---|
| 2012/0230549 A1 | 9/2012 | Takahashi | |
| 2013/0335521 A1* | 12/2013 | Lin | ...................... H04N 13/239 348/36 |
| 2014/0049612 A1* | 2/2014 | Ishii | ........................ G06T 7/593 348/46 |
| 2016/0212409 A1 | 7/2016 | Cole et al. | |
| 2016/0344999 A1* | 11/2016 | Lajeunesse | ............ H04N 5/247 |
| 2017/0186220 A1* | 6/2017 | Thiebaud | ................ G06F 3/013 |

FOREIGN PATENT DOCUMENTS

| | | |
|---|---|---|
| CN | 103488040 A | 1/2014 |
| CN | 104519340 A | 4/2015 |
| CN | 105472372 A | 4/2016 |
| CN | 205320215 U | 6/2016 |

OTHER PUBLICATIONS

Tencent Technology, IPRP, PCT/CN2017/094818, Jan. 29, 2019, 5 pgs.

Tencent Technology, ISR, PCT/CN2017/094818, Sep. 28, 2017, 2 pgs.

* cited by examiner

METHOD AND APPARATUS FOR OBTAINING BINOCULAR PANORAMIC IMAGE, AND STORAGE MEDIUM

This application is a continuation-in-part application of PCT/CN2017/094818, entitled "METHOD AND APPARATUS FOR OBTAINING BINOCULAR PANORAMIC IMAGE, AND STORAGE MEDIUM" filed on Jul. 28, 2017, which claims priority to China Patent Application 201610621487.4, filed with the Chinese Patent Office on Jul. 29, 2016 and entitled "METHOD AND APPARATUS FOR OBTAINING BINOCULAR PANORAMIC IMAGE, AND STORAGE MEDIUM", all of which is incorporated herein by reference in their entirety.

FIELD OF THE TECHNOLOGY

The present disclosure relates to the field of image processing, and in particular, to a method and an apparatus for obtaining a binocular panoramic image, and a storage medium.

BACKGROUND OF THE DISCLOSURE

A panoramic image can bring a good sense of immersion to users. Therefore, increasingly more cameras are added with a panoramic function.

A panoramic image is usually implemented in the following manner: through calibration by a single camera, multiple cameras of the same model capture multiple images and stitch the images to form panoramic images, and then the panoramic images are combined into a binocular stereo image that is transmitted to a display for displaying.

The image stitching method usually has a high requirement on an image source. Repeated stitching and image damage or distortion would occur in the stitching process, resulting in low quantity of an image obtained after stitching. In addition, it requires a large number of image sources and takes a long time to stitch a panoramic image, causing low efficiency of obtaining a panoramic image.

SUMMARY

Embodiments of the present disclosure provide a method and an apparatus for obtaining a binocular panoramic image. The technical solutions are as follows:

According to a first aspect, an embodiment of the present disclosure provides a method for obtaining a binocular panoramic image performed at an electronic apparatus having one or more processors and memory storing instructions to be executed by the one or more processors. The method includes: obtaining, by the electronic apparatus, a first panoramic image acquired by a first panoramic camera and a second panoramic image acquired by a second panoramic camera, wherein the first panoramic camera and the second panoramic camera are both horizontally disposed, the first panoramic image has multiple pixels, and the second panoramic image has multiple pixels; obtaining, by the electronic apparatus, at least one group of a first pixel and a second pixel that match each other, wherein the first pixel is a pixel located in the first panoramic image, the second pixel is a pixel located in the second panoramic image, and for the first pixel and the second pixel that match each other, pixel values of the first pixel and adjacent pixels thereof and pixel values of the second pixel and adjacent pixels thereof meet a preset condition; calculating, by the electronic apparatus, a distance between the matching first pixel and second pixel in the at least one group, wherein the distance between the first pixel and the second pixel is a distance from the second pixel to a pixel that is in the second panoramic image and that corresponds to a position of the first pixel; obtaining, by the electronic apparatus, depth information of the first panoramic image and depth information of the second panoramic image according to the distance between the first pixel and the second pixel; obtaining, by the electronic apparatus, a second monocular panoramic image through mapping by choosing one of the first panoramic image and the second panoramic image as a first monocular panoramic image, in combination with the depth information of a corresponding panoramic image used as the first monocular panoramic image, the first monocular panoramic image and a preset pupil distance between a first eye and a second eye; and displaying, by the electronic apparatus, the first monocular panoramic image in a first display region corresponding to the first eye, and displaying the second monocular panoramic image in a second display region corresponding to the second eye.

According to a second aspect, an embodiment of the present disclosure provides an electronic apparatus having one or more processors and memory coupled to the one or more processors and a plurality of instructions stored in the memory that, when executed by the one or more processors, cause the electronic apparatus to perform the foregoing method for obtaining a binocular panoramic image.

According to a third aspect, an embodiment of the present disclosure provides a non-transitory computer readable storage medium storing a plurality of instructions in connection with an electronic apparatus having one or more processors, wherein the plurality of instructions, when executed by the one or more processors, cause the electronic apparatus to perform the foregoing method for obtaining a binocular panoramic image.

The technical solutions provided by the embodiments of the present disclosure bring about the following beneficial effects:

A first panoramic image and a second panoramic image are acquired by using two horizontally disposed panoramic cameras; depth information is calculated according to a distance between matching pixels in the first panoramic image and the second panoramic image; a second monocular panoramic image is obtained through mapping by using one of the panoramic images as a first monocular panoramic image, in combination with the first monocular panoramic image, the corresponding depth information and a preset pupil distance between a first eye and a second eye, thereby obtaining a binocular stereo panoramic image. The depth information is rapidly calculated by using two panoramic images, and the second monocular panoramic image is obtained through mapping. In the process, it is unnecessary to unfold images and stitch the images into a binocular stereo panoramic image, avoiding image distortion during unfolding, reserving pixels of the original images, resolving the technical problems in the prior art that it takes a long time to obtain a binocular stereo panoramic image through image stitching and the obtained image is of low quality, and achieving an effect of obtaining a high-quality binocular stereo panoramic image efficiently.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following descriptions show only some embodiments of the present disclosure, and a person of ordinary skill in the art may still derive other drawings from these accompanying drawings without creative efforts.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods consistent with some aspects of the present disclosure as described in detail in the appended claims.

Figure 1:
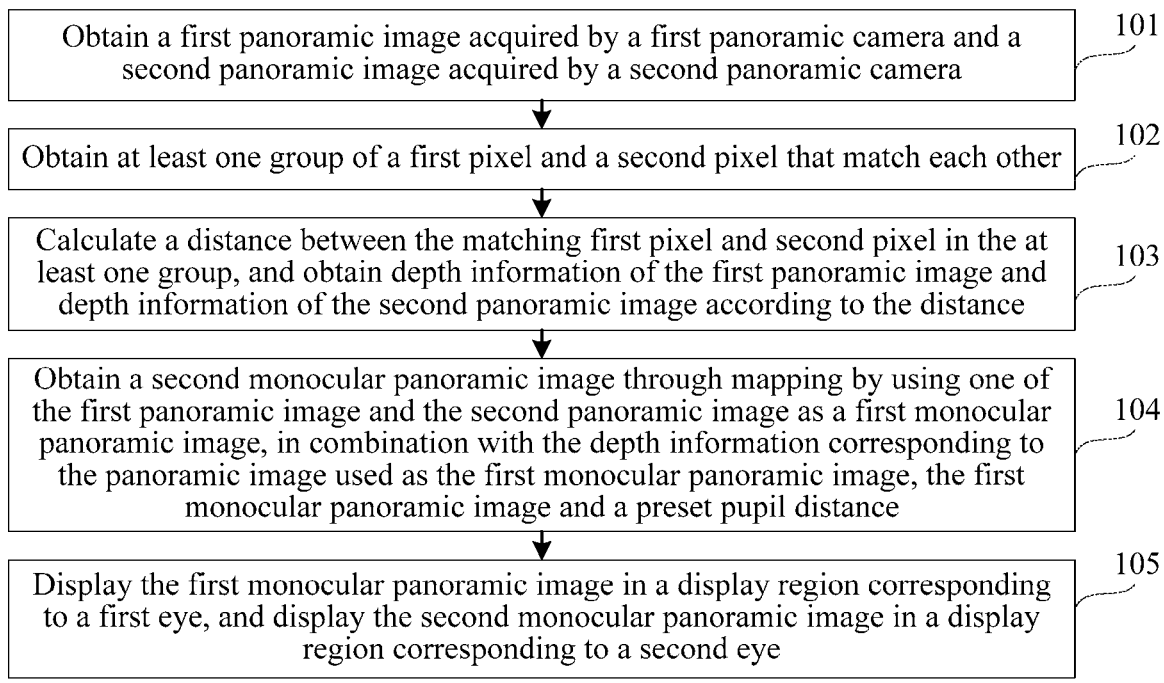
FIG. 1 is a flowchart of a method for obtaining a binocular panoramic image according to an exemplary embodiment.

FIG. 1 is a flowchart of a method for obtaining a binocular panoramic image according to an exemplary embodiment. The method for obtaining a binocular panoramic image is mainly applied to an electronic device. The electronic device herein generally may include two panoramic cameras of the same type that are disposed horizontally, and have image processing and display functions. The electronic device processes and displays images captured by the panoramic cameras. Apparently, the method for obtaining a binocular panoramic image may also be applied to a system. The system includes two panoramic cameras of the same type that are disposed horizontally, and an electronic device having image processing and display functions. In this case, the panoramic cameras transmit captured image information to the electronic device for image processing and display. As shown in FIG. 1, the method for obtaining a binocular panoramic image may include the following steps:

Step 101: Obtain a first panoramic image acquired by a first panoramic camera and a second panoramic image acquired by a second panoramic camera.

The first panoramic camera and the second panoramic camera are both horizontally disposed.

The first panoramic camera and the second panoramic camera herein are generally panoramic camera of the same type. The two panoramic cameras capture panoramic images simultaneously. In a subsequent processing process, panoramic images captured by the two panoramic cameras at the same moment are processed correspondingly.

Step 102: Obtain at least one group of a first pixel and a second pixel that match each other.

The first pixel is a pixel located in the first panoramic image, and the second pixel is a pixel located in the second panoramic image.

At least one group of pixels that match each other is obtained from the first panoramic image and the second panoramic image. In each group of pixels, a pixel located in the first panoramic image is recorded as a first pixel, and a pixel located in the second panoramic image is recorded as a second pixel. For the first pixel and the second pixel that match each other, pixel values of the first pixel and adjacent pixels thereof and pixel values of the second pixel and adjacent pixels thereof meet a preset condition.

Step 103: Calculate a distance between the matching first pixel and second pixel in the at least one group, and obtain depth information of the first panoramic image and depth information of the second panoramic image according to the distance between the first pixel and the second pixel.

The depth information can reflect a sense of stereo space of a panoramic image, that is, depth information can represent a distance between an object and a camera. The distance between the first pixel and the second pixel is a distance from the second pixel to a pixel that is in the second panoramic image and that corresponds to a position of the first pixel.

Step 104: Obtain a second monocular panoramic image through mapping by choosing one of the first panoramic image and the second panoramic image as a first monocular panoramic image, in combination with the depth information of a corresponding panoramic image used as the first monocular panoramic image, the first monocular panoramic image and a preset pupil distance between a first eye and a second eye The preset pupil distance herein represents a distance between two pupils of a user. A distance between pupils of an ordinary adult is generally 6 cm. In actual application, the value of the preset pupil distance may be set according to actual pupil distances of different users.

Optionally, the electronic device or system may be provided with a device for capturing a user pupil distance, so as to capture an actual pupil distance of a current user, and determine the captured actual pupil distance as the preset pupil distance.

Optionally, the electronic device or system may provide a pupil distance selection function. A user can select a pupil distance according to a pupil distance thereof. The pupil distance selected by the user is determined as the preset pupil distance.

Optionally, the electronic device or the system may provide a pupil distance selection control on a display interface when providing the pupil distance selection function. A user selects a pupil distance thereof by using the pupil distance selection control.

Optionally, the electronic device or system can set a number selection key when providing the pupil distance selection function. A number selected by the user through the number selection key is used as a pupil distance of the user.

Step 105: Display the first monocular panoramic image in a first display region corresponding to the first eye, and display the second monocular panoramic image in a second display region corresponding to the second eye.

Generally speaking, a distance between centers of the display region corresponding to the first eye and the display region corresponding to the second eye is the same as or close to the preset pupil distance, so that the user does not feel dizzy when watching the image.

Using the electronic device or system being smart glasses as an example, the display region corresponding to the first eye may be a region corresponding to one eyeglass, and the display region corresponding to the second eye may be a region corresponding to the other eyeglass.

In conclusion, in the method for obtaining a binocular panoramic image provided in this embodiment of the present disclosure, a first panoramic image and a second panoramic image are acquired by using two horizontally disposed panoramic cameras; depth information is calculated according to a distance between matching pixels in the first panoramic image and the second panoramic image; a second monocular panoramic image is obtained through mapping by using one of the panoramic images as a first monocular panoramic image, in combination with the first monocular panoramic image, the corresponding depth information and a preset pupil distance between a first eye and a second eye, thereby obtaining a binocular stereo panoramic image. The depth information is rapidly calculated by using two panoramic images, and the second monocular panoramic image is obtained through mapping. In the process, it is unnecessary to unfold images and stitch the images into a binocular stereo panoramic image, avoiding image distortion during unfolding, reserving pixels of the original images, resolving the technical problems in the prior art that it takes a long time to obtain a binocular stereo panoramic image through image stitching and the obtained image is of low quality, and achieving an effect of obtaining a high-quality binocular stereo panoramic image efficiently.

In actual application, in order to obtain matching pixels in the first panoramic image and the second panoramic image more efficiently, the captured first initial panoramic image and second initial panoramic image may be rectified, so that matching pixels in the rectified first panoramic image and second panoramic image are on the same horizontal axis. Refer to steps shown in FIG. 2A.

Figure 2A:
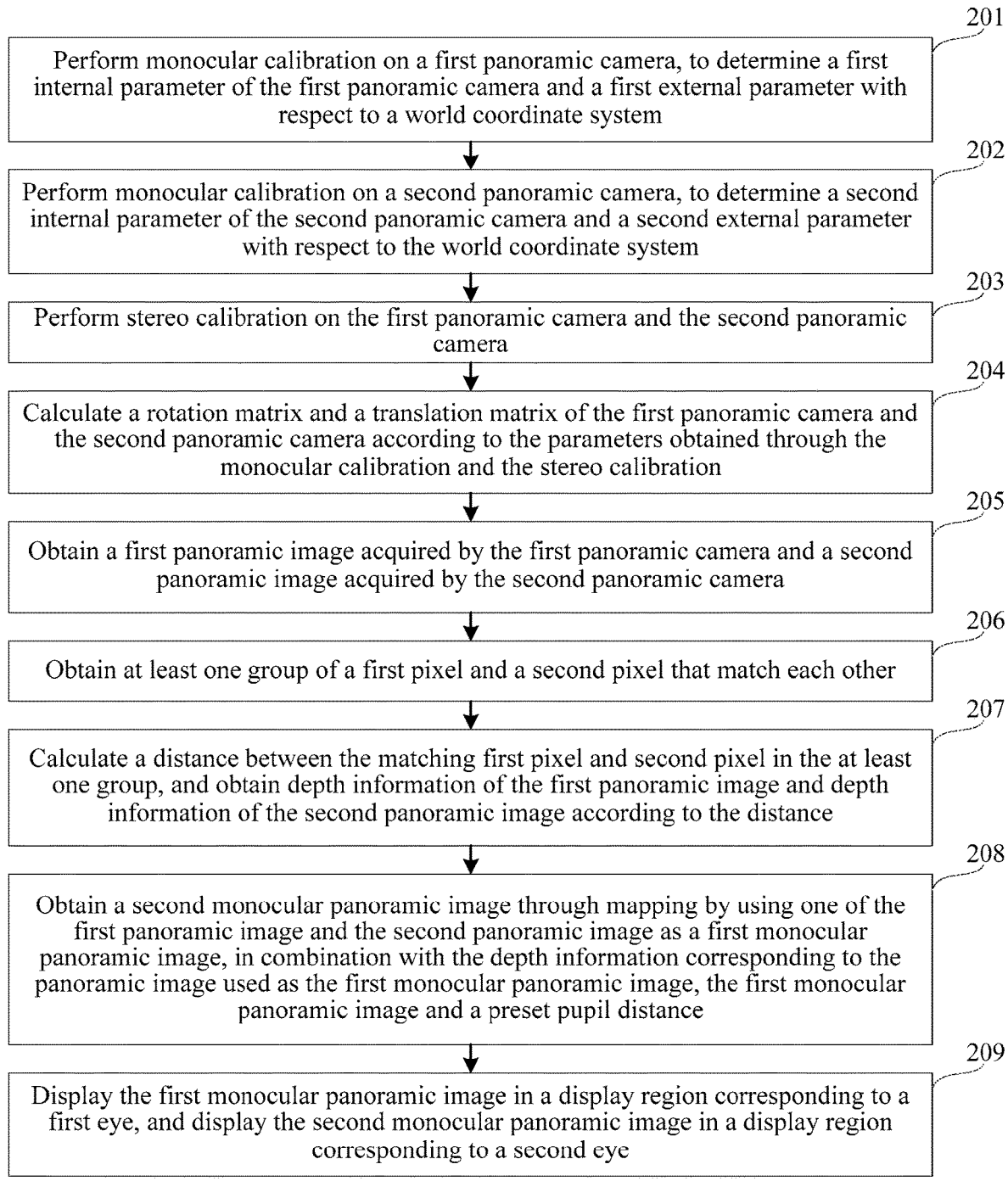
FIG. 2A is a flowchart of a method for obtaining a binocular panoramic image according to another exemplary embodiment.

FIG. 2A is a flowchart of a method for obtaining a binocular panoramic image according to another exemplary embodiment. The method for obtaining a binocular panoramic image is mainly applied to an electronic device. The electronic device herein generally may include two panoramic cameras of the same type that are disposed horizontally, and have image processing and display functions. The electronic device processes and displays images captured by the panoramic cameras. Apparently, the method for obtaining a binocular panoramic image may also be applied to a system. The system includes two panoramic cameras of the same type that are disposed horizontally, and an electronic device having image processing and display functions. In this case, the panoramic cameras transmit captured image information to the electronic device for image processing and display. As shown in FIG. 2A, the method for obtaining a binocular panoramic image may include the following steps:

Generally, during image rectification, it is necessary to obtain related parameters of the cameras, and the related parameters of the cameras are generally obtained through calibration. Specifically, reference may be made to the method described in step 201 to step 204.

Step 201: Perform monocular calibration on a first panoramic camera, to determine a first internal parameter of the first panoramic camera and a first external parameter with respect to a real-world coordinate system.

Step 202: Perform monocular calibration on a second panoramic camera, to determine a second internal parameter of the second panoramic camera and a second external parameter with respect to the real-world coordinate system.

In the monocular calibration herein, multiple images with calibration boards are shot by using two panoramic cameras, to calculate internal parameters of the cameras and external parameters with respect to the real-world coordinate system, where the calibration board herein is similar to grid lines in a chessboard.

Step 203: Perform stereo calibration on the first panoramic camera and the second panoramic camera.

In the stereo calibration herein, a relative position parameter between the first panoramic camera and the second panoramic camera is determined according to the first internal parameter, the first external parameter, the second internal parameter and the second external parameter.

Step 204: Calculate a rotation matrix and a translation matrix of the first panoramic camera and the second panoramic camera according to the parameters obtained through the monocular calibration and the stereo calibration.

The first panoramic camera and the second panoramic camera are calibrated separately. For example, when the first panoramic camera is a left panoramic camera and the second panoramic camera is a right panoramic camera, external parameters $R_l$ and $T_l$ of the left panoramic camera as well as external parameters $R_r$ and $T_r$ of the right panoramic camera are obtained, and binocular calibration is performed. It is assumed that, for a random point in a three-dimensional scenario, coordinates thereof in the real-world coordinate system are $(X_w, Y_w, Z_w)$, coordinates thereof in the left panoramic camera are $(X_l, Y_l, Z_l)$, and coordinates thereof in the right panoramic camera are $(X_r, Y_r, Z_r)$. When written into a homogeneous coordinate form, the coordinates include the following formula (1) and formula (2):

$$X1Y1Z1 = R1T101 XwYwZw1 \begin{bmatrix} X_l \\ Y_l \\ Z_l \\ 1 \end{bmatrix} = \begin{bmatrix} R_l & T_l \\ 0 & 1 \end{bmatrix} \begin{bmatrix} X_w \\ Y_w \\ Z_w \\ 1 \end{bmatrix} \quad (1)$$

$$XlYlZl1 = RlTl01 XwYwZw1 \begin{bmatrix} X_r \\ Y_r \\ Z_r \\ 1 \end{bmatrix} = \begin{bmatrix} R_r & T_r \\ 0 & 1 \end{bmatrix} \begin{bmatrix} X_w \\ Y_w \\ Z_w \\ 1 \end{bmatrix} \quad (2)$$

The following formula (3) is obtained according to the formula (1) and the formula (2):

$$\begin{bmatrix} X_r \\ Y_r \\ Z_r \\ 1 \end{bmatrix} = \begin{bmatrix} R_l^{-T}R_r & T_r - R_l^{-1}R_rT_l \\ o^T & 1 \end{bmatrix} \begin{bmatrix} X_l \\ Y_l \\ Z_l \\ 1 \end{bmatrix} = \begin{bmatrix} R & T \\ 0 & 1 \end{bmatrix} \begin{bmatrix} X_l \\ Y_l \\ Z_l \\ 1 \end{bmatrix} \quad (3)$$

that is, $$R = R_l^{-T} R_r \quad (4)$$

$$T = T_r - R_l^{-1} R_r T_l \quad (5)$$

After the calibration is finished, a rotation matrix R and a translation matrix T are obtained. It can be known from the formula (3) that, the rotation matrix R and the translation matrix T are parameters needed for mapping from the coordinate system of the first panoramic camera to the coordinate system of the second panoramic camera.

Step 205: Obtain a first panoramic image acquired by the first panoramic camera and a second panoramic image acquired by the second panoramic camera.

Figure 2B:
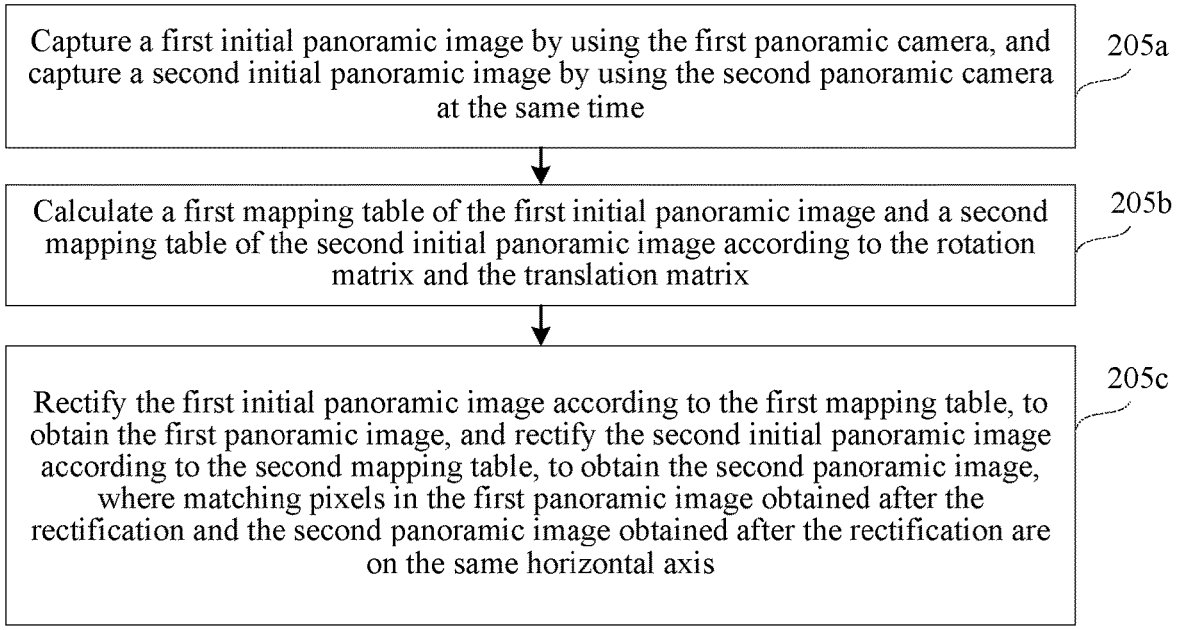
FIG. 2B is a flowchart of obtaining a first panoramic image acquired by a first panoramic camera and a second panoramic image acquired by a second panoramic camera according to an exemplary embodiment.

Optionally, the obtaining a first panoramic image acquired by the first panoramic camera and a second panoramic image acquired by the second panoramic camera may further include the steps shown in FIG. 2B:

Step 205*a*: Capture a first initial panoramic image by using the first panoramic camera, and capture a second initial panoramic image by using the second panoramic camera at the same time.

Step 205*b*: Calculate a first mapping table of the first initial panoramic image and a second mapping table of the second initial panoramic image according to the rotation matrix and the translation matrix.

The first mapping table herein stores a correspondence between coordinates of each pixel in the first initial panoramic image before and after transformation based on the rotation matrix and the translation matrix, and the second mapping table stores a correspondence between coordinates of each pixel in the second initial panoramic image before and after transformation based on the rotation matrix and the translation matrix Step 205*c*: Rectify the first initial panoramic image according to the first mapping table, to obtain the first panoramic image, and rectify the second initial panoramic image according to the second mapping table, to obtain the second panoramic image, where matching pixels in the first panoramic image obtained after the rectification and the second panoramic image obtained after the rectification are on the same horizontal axis.

The mapping table already stores a correspondence between calculated coordinates of pixels before and after transformation based on the rotation matrix and the translation matrix. By searching the mapping table and according to the correspondence in the mapping table, a pixel at a corresponding coordinate position in an image before transformation can be moved to a corresponding coordinate position after transformation, thereby rectifying the image.

Step 206: Obtain at least one group of a first pixel and a second pixel that match each other.

The first pixel is a pixel located in the first panoramic image, and the second pixel is a pixel located in the second panoramic image.

Figure 2C:
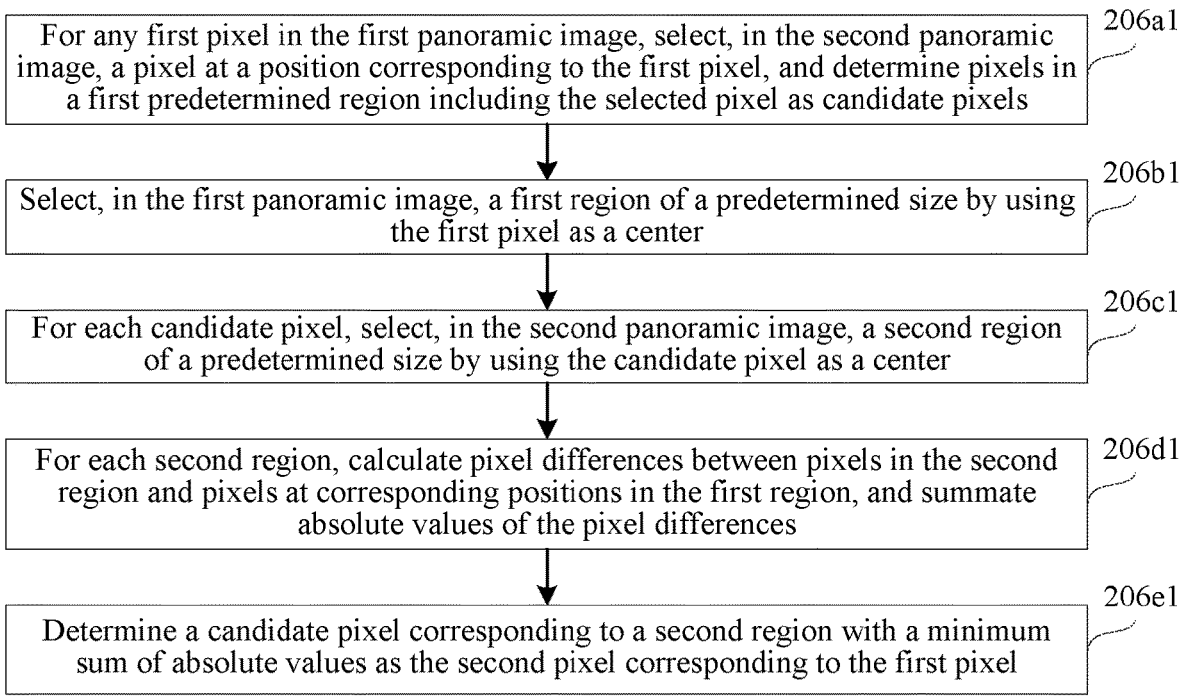
FIG. 2C is a flowchart of obtaining at least one group of a first pixel and a second pixel that match each other according to an exemplary embodiment.

Optionally, the obtaining at least one group of a first pixel and a second pixel that match each other may include steps shown in FIG. 2C:

Step 206*a*1: For any first pixel in the first panoramic image, select, in the second panoramic image, a pixel at a position corresponding to the first pixel, and determine pixels in a first predetermined region including the selected pixel as candidate pixels.

The number of pixels in the first panoramic image is the same as the number of pixels in the second panoramic image. Therefore, a corresponding coordinate position of each pixel is fixed in the entire image. The corresponding position herein can be construed as a pixel having the same coordinate position as the first pixel. The size of the first predetermined region may be set in advance. For example, by using a selected pixel as a center, a horizontal line segment of a predetermined length is selected, and pixels on the line segment are determined as candidate pixels.

In actual application, if a pixel in a panoramic image captured by a left camera is used as reference, during selection of candidate pixels in a panoramic image captured by a right camera, pixels in a predetermined range on the left of the position of the pixel used as reference may be selected. An object in the image captured by the right camera will deviate leftwards with respect to the same object in the image captured by the left camera. Therefore, a search range can be properly reduced by performing search in the position on the left of the reference pixel, so that a matching pixel can be determined more quickly.

Step 206*b*1: Select, in the first panoramic image, a first region of a predetermined size by using the first pixel as a center.

The shape of the first region herein may be a circle, a rectangle, a polygon, or the like. The shape of the first region is not limited herein.

Step 206*c*1: For each candidate pixel, select, in the second panoramic image, a second region of a predetermined size by using the candidate pixel as a center.

The selected second region has the same shape and size with the first region. That is, the number of pixels in the first region is the same as the number of pixels in the second region, and the shape formed by the pixels in the first region is the same as the shape formed by the pixels in the second region.

Step 206*d*1: For each second region, calculate pixel differences between pixels in the second region and pixels at corresponding positions in the first region, and summate absolute values of the pixel differences.

During calculation of pixel differences, obtained results may include positive values and negative values. Therefore, it is necessary to take absolute values of the pixel differences. Because the number of pixels and positions of pixels in the first region correspond to the number of pixels and positions of pixels in the second region, during calculation of pixel differences, each pixel difference between pixels that are in the first region and the second region and that have consistent coordinate positions with respect to the whole region is calculated.

Step 206*e*1: Determine a candidate pixel corresponding to a second region with a minimum sum of absolute values as the second pixel corresponding to the first pixel A smaller absolute value represents a high degree of similarity between a pixel in the first region and a pixel in the second region.

Figure 2D:
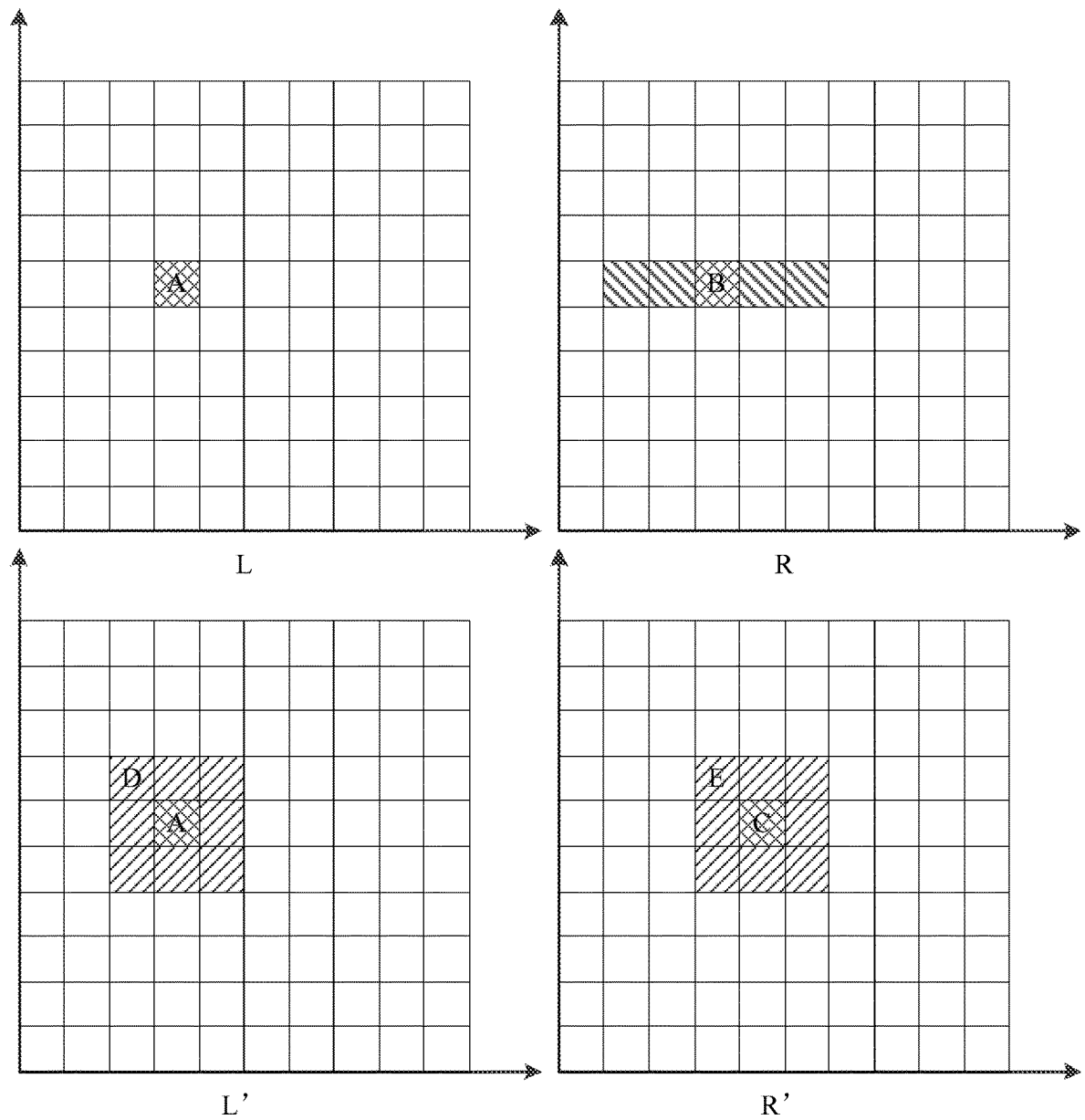
FIG. 2D is a schematic diagram of determining matching pixels in a first panoramic image and a second panoramic image according to an exemplary embodiment.

For example, as shown in FIG. 2D, a first pixel A is selected in the left image L. Using the coordinate system established in the figure as an example, coordinates corresponding to point A are (4, 6), and pixel B whose coordinates are (4, 6) is selected in the right image R. First of all, pixels in a predetermined region in the right image R are selected as candidate pixels. Herein, a region of a line segment having a horizontal length of 5 is selected as the predetermined region, that is, five pixels in the shaded part are selected as the candidate pixels. Then, a first region with the first pixel A as a center is selected. For example, a square region having a side length of 3 is selected, as shown by the shaded region in the left image L'. For each candidate pixel, a second region having the same shape and size as the first region is selected by using the candidate pixel as a center. Using candidate pixel C in the right image R' as an example, pixels in a shaded region having a side length of 3 in the right image R' are selected, and pixel differences between pixels at corresponding positions in the first region and the second region are calculated. For example, pixel A in the left image L' and pixel C in the right image R' are a group of pixels whose positions correspond to each other in the shaded region, and pixel D in the left image L' and pixel E in the right image R' are also a group of pixels whose positions correspond to each other in the shaded region; a pixel difference between pixels in each group in the shaded region is calculated separately, and an absolute value of the pixel difference is taken. Absolute values of pixel differences between all pixels positions correspond to each other in the shaded region are summated. A candidate pixel with a minimum sum of absolute values of pixel differences is found, and the found candidate pixel is determined as the second pixel matching the first pixel.

For example, matching pixels in the first panoramic image and the second panoramic image may be determined by using a block matching algorithm. In the block matching algorithm, a search window of (2*n+1)*(2*n+1) and a matching point search range m are determined, where m is a maximum distance, and n is positive integers such as 1, 2, 3 and so on. Then, the first panoramic image and the second panoramic image are traversed. For any pixel in the first panoramic image, pixels in the range m around the corresponding position in the second panoramic image are compared with the pixel in the first panoramic image, to find a pixel with a highest degree of similarity with the pixel in the first panoramic image.

A similarity degree is evaluated by calculating pixel differences between the first panoramic image and the second panoramic image, where l and k are the length and width of a scan window, $x_1$ and $y_1$ are pixel coordinates of $I_1$ in the first panoramic image, and $x_2$ and $y_2$ are pixel coordinates of $I_2$ in the second panoramic image. A pixel difference between two points is squared to eliminate impact of a negative value and represent a similarity degree between the two points.

$$s = \sum_{i=-l}^{l} \sum_{j=-k}^{k} (I_1(x_1 + i, y_1 + j) - I_2(x_2 + i, y_2 + j))^2 \qquad (6)$$

There may be more than one selected candidate pixel. Pixels in a region with the first pixel as a center may be compared with pixels in an identical region with the candidate pixel as a center, to obtain a similarity degree, thereby determining a pixel point matching the first pixel. During calculation of the similarity degree, comparison may be made based on a sum of absolute values of pixel differences between pixels at corresponding positions in the region, or comparison may be made based on an average value of absolute values of pixel differences between pixels at corresponding positions in the region. A candidate pixel that corresponds to a highest similarity degree, that is, a minimum sum of absolute values of pixel differences, is the pixel matching the first pixel.

In order to obtain a binocular panoramic image more quickly when each frame of image is processed in real time, the process of determining matching pixels may be accelerated. For an acceleration method, reference may be made to a method described in step 206a2 to step 206e2.

Figure 2E:
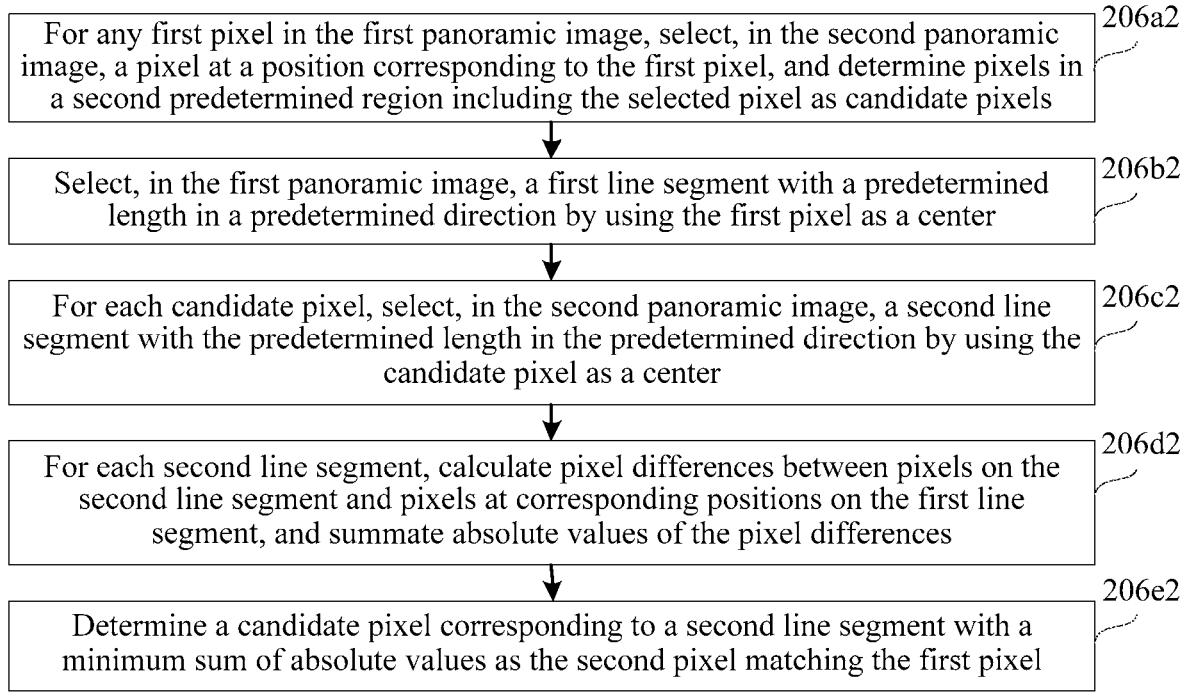
FIG. 2E is a flowchart of obtaining at least one group of a first pixel and a second pixel that match each other according to another exemplary embodiment.

Optionally, after at least one group of a first pixel and a second pixel that match each other is obtained, the method may further include steps as shown in FIG. 2E:

Step 206a2: For any first pixel in the first panoramic image, select, in the second panoramic image, a pixel at a position corresponding to the first pixel, and determine pixels in a second predetermined region comprising the selected pixel as candidate pixels Step 206a2 is similar to step 206a1, and is not described herein again.

Step 206b2: Select, in the first panoramic image, a first line segment with a predetermined length in a predetermined direction by using the first pixel as a center Herein, a region for calculating similarity degrees of pixels surrounding a pixel in step 206b1 is improved to be a line segment, so that the number of sampling points is reduced during calculation of a similarity degree, thereby accelerating the calculation speed.

Optionally, one or more line segments with a predetermined length in a predetermined direction may be selected for comparison. For example, at least one line segment with a predetermined length along a horizontal direction, a vertical direction or a diagonal direction may be selected using the first pixel as a center.

Step 206c2: For each candidate pixel, select, in the second panoramic image, a second line segment with the predetermined length in the predetermined direction by using the candidate pixel as a center Step 206d2: For each second line segment, calculate pixel differences between pixels on the second line segment and pixels at corresponding positions on the first line segment, and summate absolute values of the pixel differences.

Step 206e2: Determine a candidate pixel corresponding to a second line segment with a minimum sum of absolute values as the second pixel matching the first pixel.

Optionally, during calculation of similarity degrees between pixels on the line segments, a weighted summating method may also be used. That is, a pixel farther away from the center has a smaller weight value.

Optionally, a graphics processing unit (GPU) may also be used for acceleration. Parallel computing is carried out in the GPU, and therefore, a higher computing speed is achieved, so that the algorithm is accelerated and it takes a shorter time to obtain a binocular panoramic image.

Optionally, after the candidate pixel corresponding to a second region with a minimum sum of absolute values is determined as the second pixel matching the first pixel, the pixel determined through matching is verified by using the following method:

For each determined group of the first pixel and the second pixel in the second panoramic image, a pixel having a highest matching degree with the second pixel is determined in the first panoramic image, and when the pixel in the first panoramic image having the highest matching degree with the second pixel is the first pixel, the first pixel and the second pixel are stored as a group.

In this verification manner, any group of a first pixel and a second pixel determined in any of the foregoing methods is verified through bidirectional matching. For example, according to a first pixel A in the first panoramic image, a second pixel B matching A is determined in the second panoramic image. Then, a matching pixel is searched for in the first panoramic image according to the second pixel B, and when the found matching pixel is A, it is determined that the first pixel A and the second pixel B are a group of matching pixels. Matching precision can be improved through the bidirectional matching method.

Step 207: Calculate a distance between the matching first pixel and second pixel in the at least one group, and obtain depth information of the first panoramic image and depth information of the second panoramic image according to the distance between the first pixel and the second pixel.

When a camera takes a picture of a scene, if a shooting position of an object close to the camera changes in the camera, the position of the object in the image deviates significantly, while the position of an object far away from the camera deviates slightly in the image. Therefore, a distance from the object to the camera can be calculated according to a deviation distance, that is, calculate depth information of different pixels.

Figure 2F:
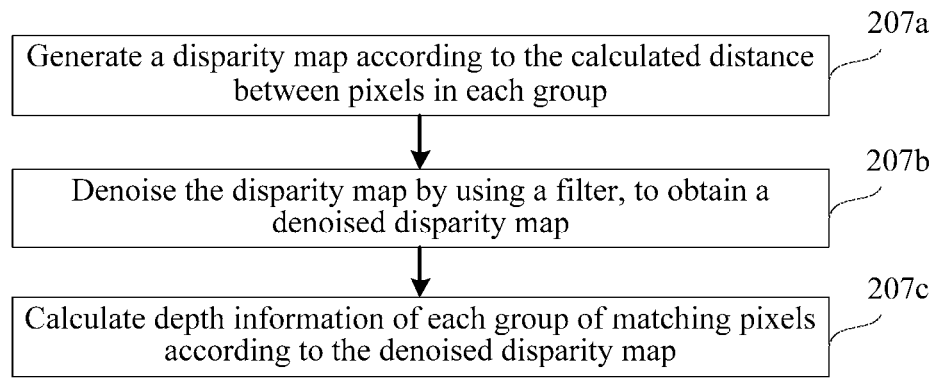
FIG. 2F is a flowchart of calculating a distance between a first pixel and a second pixel that match each other in at least one group and obtaining depth information of a first panoramic image and depth information of a second panoramic image in accordance with the distance according to an exemplary embodiment.

Optionally, the calculating a distance between the matching first pixel and second pixel in the at least one group, and obtaining depth information of the first panoramic image and depth information of the second panoramic image according to the distance between the first pixel and the second pixel may include steps shown in FIG. 2F:

Step 207a: Generate a disparity map according to the calculated distance between the first and second pixels in each group.

In the disparity map mentioned herein, by using a storage region having the same size as the image captured by the camera, a deviation distance of each pixel is stored corresponding to the pixel.

Step 207b: Denoise the disparity map by using a filter, to obtain a denoised disparity map.

In actual application, precision of matching pixels cannot reach 100%. Therefore, distances between some pixels may be calculated erroneously in the disparity map, and the image needs to be denoised properly by using a filter, so that the obtained disparity map is smoother.

For example, a weighted least square filter is used to filter the disparity map.

For a given input image g, a new image u is searched for. On one hand, u should be close to g as much as possible. On the other hand, u should be as smooth as possible. A minimum value of the following formula should be found:

$$\sum_p \left((u_p - g_p)^2 + \lambda\left(a_x, p(g)\left(\frac{\partial u}{\partial x}\right)_p^2 + a_y, p(g)\left(\frac{\partial u}{\partial y}\right)_p^2\right)\right) \quad (7)$$

The subscript p represents a pixel position. The objective of $(u_p-g_p)^2$ is to reduce the distance between u and g. The second parameter item is to minimize a partial derivative of u, so as to make u smooth. Smooth weights are $a_x$ and $a_y$, which are determined according to g. $\lambda$ is responsible for balancing two item parameters:

$$(u_p - g_p)^2 \text{ and } \left(a_x, p(g)\left(\frac{\partial u}{\partial x}\right)_p^2 + a_y, p(g)\left(\frac{\partial u}{\partial y}\right)_p^2\right),$$

and the image u can be smoother by increasing the value of $\lambda$. Therefore, formula (8) can be obtained by rewriting the formula (7) in a matrix mode:

$$(u-g)^2(u-g)+\lambda(u^T D_x^T A_x D_x u + u^T D_y^T A_y D_y u) \quad (8)$$

$A_x$ and $A_y$ are diagonal matrixes, including the smooth weights $a_x$ and $a_y$. $D_x^T$ and $D_y^T$ are discrete differential operators.

The formula (8) is minimized, and the vector u is defined as a solution to a linear formula:

$$(I+\lambda L_g)u = g \quad (9)$$

where $L_g + D_x^T A_x D_x + D_y^T A_y D_y$
Formula (10) is obtained:

$$u = F_\lambda(g) = (I+\lambda L_g)^{-1} g \quad (10)$$

Step 207c: Calculate depth information of each group of matching pixels according to the denoised disparity map.

The denoised disparity map reduces impact of noise. Calculating depth information of pixels by using the denoised disparity map helps obtain a more authentic second monocular panoramic image during mapping.

Figure 2G:
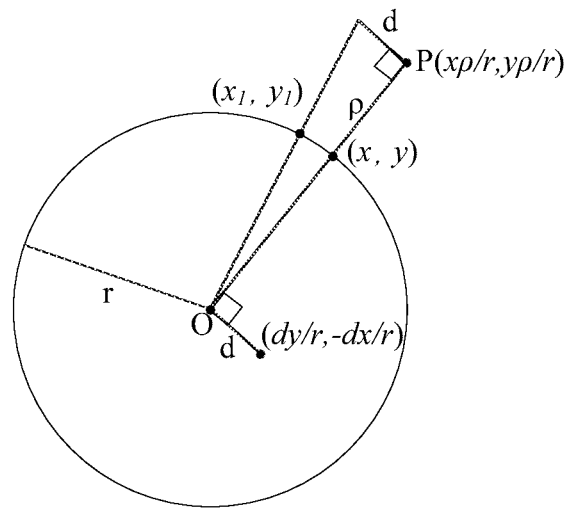
FIG. 2G is a schematic diagram of coordinates of an object in a right-eye image mapped from coordinates of the object in a left-eye image according to an exemplary embodiment.

Step 208: Obtain a second monocular panoramic image through mapping by choosing one of the first panoramic image and the second panoramic image as a first monocular panoramic image, in combination with the depth information of a corresponding panoramic image used as the first monocular panoramic image, the first monocular panoramic image and a preset pupil distance between a first eye and a second eye As shown in FIG. 2G, when the first monocular panoramic image corresponds to an image seen by the left eye, it is assumed that the center of the left eye is O, the left eye sees that an object P appears at a pixel (x, y) on the image, and a distance is $\rho$. A distance between the right eye and the left eye of an ordinary person is approximately 6 cm, which is expressed as d. In order to calculate a pixel of the object P corresponding to the right eye, translation is performed in a manner of being perpendicular to OP and then connection to O is performed, to obtain a point $(x_1, y_1)$, which is the position corresponding to the right eye.

According to the similarity, it can be calculated that coordinates of P are $(x\rho/r, y\rho/r)$, and coordinates of the right eye are $(dy/r, -dx/r)$. Therefore, formulas for obtaining new coordinates $(x_1, y_1)$ are:

$$x_1 = \sqrt{\frac{r^2(x\rho - dy)^2}{(y\rho + dx)^2 + (x\rho - dy)^2}} \quad (11)$$

$$y_1 = \sqrt{\frac{r^2(y\rho - dx)^2}{(y\rho + dx)^2 + (x\rho - dy)^2}} \quad (12)$$

Step 209: Display the first monocular panoramic image in a first display region corresponding to the first eye, and display the second monocular panoramic image in a second display region corresponding to the second eye.

The display regions herein may be display regions in a virtual reality helmet that correspond to the left and right eyes, or may be regions in virtual glasses corresponding to the left and right eyes.

Figure 2H:
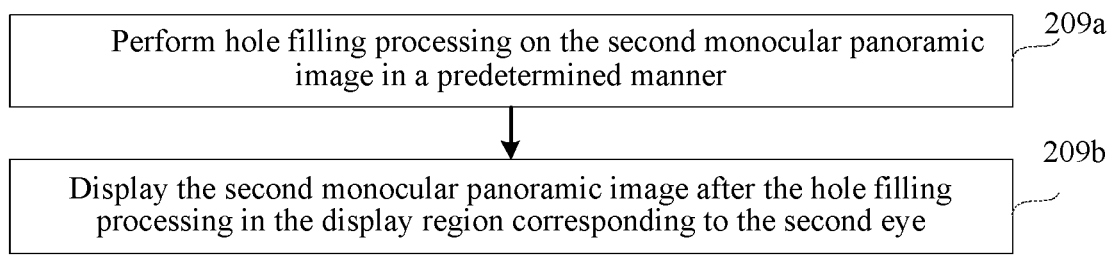
FIG. 2H is a flowchart of displaying a second monocular panoramic image in a display region corresponding to a second eye according to an exemplary embodiment.

Optionally, the displaying the second monocular panoramic image in a second display region corresponding to the second eye may include steps shown in FIG. 2H:

Step 209a: Perform hole filling processing on the second monocular panoramic image in a predetermined manner.

The hole filling herein is used for filling a hole that is generated due to image rotation or shielding during mapping. Some holes will be generated during image mapping. No pixel values are stored in pixels corresponding to the holes, and thus the holes are generated. In order to obtain a complete image, it is necessary to fill the holes.

Optionally, different hole filling manners may be selected according to different time and precision requirements. If high real-time performance is required, hole filling can be directly performed according to an average value of surrounding pixels. If a high-quality effect is required, a weighted analysis-based image repair algorithm may be selected.

Step 209b: Display the second monocular panoramic image after the hole filling processing in the display region corresponding to the second eye.

In conclusion, in the method for obtaining a binocular panoramic image provided in this embodiment of the present disclosure, a first panoramic image and a second panoramic image are acquired by using two horizontally disposed panoramic cameras; depth information is calculated according to a distance between matching pixels in the first panoramic image and the second panoramic image; a second monocular panoramic image is obtained through mapping by using one of the panoramic images as a first monocular panoramic image, in combination with the first monocular panoramic image, the corresponding depth information and a preset pupil distance between a first eye and a second eye, thereby obtaining a binocular stereo panoramic image. The depth information is rapidly calculated by using two panoramic images, and the second monocular panoramic image is obtained through mapping. In the process, it is unnecessary to unfold images and stitch the images into a binocular stereo panoramic image, avoiding image distortion during unfolding, reserving pixels of the original images, resolving the technical problems in the prior art that it takes a long time to obtain a binocular stereo panoramic image through image stitching and the obtained image is of low quality, and achieving an effect of obtaining a high-quality binocular stereo panoramic image efficiently.

In addition, related parameters of the panoramic cameras are obtained through calibration. A rotation matrix and a translation matrix are calculated by using the parameters, so that the first panoramic image and the second panoramic image can be rectified subsequently by using the rotation matrix and the translation matrix.

In addition, coordinates of pixels in an image before and after transformation are calculated by using the rotation matrix and the translation matrix, and a correspondence between coordinates before and after transformation is stored in a mapping table. The first panoramic image and the second panoramic image are rectified by searching mapping tables, so that matching pixels after rectification are on the same horizontal axis. Therefore, matching pixels can be found rapidly in the subsequent step, and depth information calculated by using a distance between pixels with a high matching degree is used for mapping, accelerating the speed of obtaining a binocular panoramic image.

In addition, candidate pixels in a predetermined range around a position corresponding to the first pixel are selected in the second panoramic image, and degrees of similarity between the candidate pixels and pixels in a region surrounding the first pixel are calculated, to determine a matching pixel. Pixels interfering with the matching result are eliminated by calculating the degrees of similarity between surrounding pixels, so that the pixel obtained through matching is more accurate.

In addition, reverse matching is performed on the determined matching pixel. A matching pixel determined in the second panoramic image according to the first pixel is a second pixel, and then it is determined whether a matching point found in the first panoramic image according to the second pixel is the first pixel. The determined matching point is more accurate through two matching verifications.

In addition, pixels on a predetermined line segment are used as candidate pixels for calculating similarity degrees, so that less data is selected during calculation, thereby accelerating the calculation process.

In addition, a filter is used for denoising a disparity map, to reduce impact on the disparity map caused by erroneously calculated points in the disparity map, so that the obtained disparity map becomes smoother.

In addition, holes in the second monocular panoramic image that are generated due to image rotation or shielding during mapping are filled, thereby improving image quality of the second monocular panoramic image.

Figure 3:
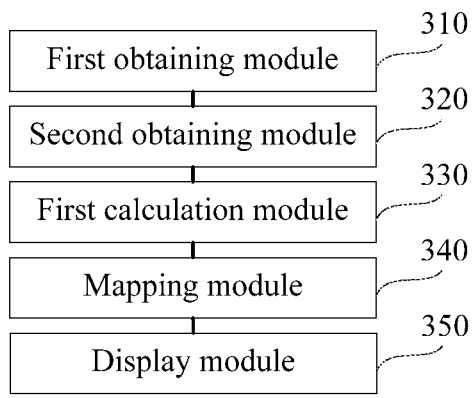
FIG. 3 is a block diagram of an apparatus for obtaining a binocular panoramic image according to an exemplary embodiment.

FIG. 3 is a block diagram of an apparatus for obtaining a binocular panoramic image according to an exemplary embodiment. The apparatus for obtaining a binocular panoramic image is mainly applied to an electronic device. The electronic device herein generally may include two panoramic cameras of the same type that are disposed horizontally, and have image processing and display functions. The electronic device processes and displays images captured by the panoramic cameras. Apparently, the apparatus for obtaining a binocular panoramic image may also be applied to a system. The system includes two panoramic cameras of the same type that are disposed horizontally, and an electronic device having image processing and display functions. In this case, the panoramic cameras transmit captured image information to the electronic device for image processing and display. As shown in FIG. 3, the apparatus for obtaining a binocular panoramic image includes, but is not limited to: a first obtaining module 310, a second obtaining module 320, a first calculation module 330, a mapping module 340 and a display module 350.

The first obtaining module 310 is configured to obtain a first panoramic image acquired by a first panoramic camera and a second panoramic image acquired by a second panoramic camera.

The second obtaining module 320 is configured to obtain at least one group of a first pixel and a second pixel that match each other.

The first pixel is a pixel located in the first panoramic image obtained by the first obtaining module 310, the second pixel is a pixel located in the second panoramic image obtained by the first obtaining module 310, and for the first pixel and the second pixel that match each other, pixel values of the first pixel and adjacent pixels thereof and pixel values of the second pixel and adjacent pixels thereof meet a preset condition.

The first calculation module 330 is configured to calculate a distance between the matching first pixel and second pixel in the at least one group obtained by the second obtaining module 320, and obtain depth information of the first panoramic image and depth information of the second panoramic image according to the distance between the first pixel and the second pixel, where the depth information is used for representing a distance between an object and a camera, and the distance between the first pixel and the second pixel is a distance from the second pixel to a pixel that is in the second panoramic image and that corresponds to a position of the first pixel.

The mapping module 340 is configured to obtain a second monocular panoramic image through mapping by using one of the first panoramic image and the second panoramic image obtained by the first obtaining module 310 as a first monocular panoramic image, in combination with the depth information which is calculated by the first calculation module 330 and corresponding to the panoramic image used as the first monocular panoramic image, the first monocular panoramic image and a preset pupil distance between a first eye and a second eye.

The display module 350 is configured to display the first monocular panoramic image in a first display region corresponding to the first eye, and display, in a display region corresponding to a second eye, the second monocular panoramic image obtained by the mapping module 340 through mapping.

In conclusion, in the apparatus for obtaining a binocular panoramic image provided in this embodiment of the present disclosure, a first panoramic image and a second panoramic image are acquired by using two horizontally disposed panoramic cameras; depth information is calculated according to a distance between matching pixels in the first panoramic image and the second panoramic image; a second monocular panoramic image is obtained through mapping by using one of the panoramic images as a first monocular panoramic image, in combination with the first monocular panoramic image, the corresponding depth information and a preset pupil distance between a first eye and a second eye, thereby obtaining a binocular stereo panoramic image. The depth information is rapidly calculated by using two panoramic images, and the second monocular panoramic image is obtained through mapping. In the process, it is unnecessary to unfold images and stitch the images into a binocular stereo panoramic image, avoiding image distortion during unfolding, reserving pixels of the original images, resolving the technical problems in the prior art that it takes a long time to obtain a binocular stereo panoramic image through image stitching and the obtained image is of low quality, and achieving an effect of obtaining a high-quality binocular stereo panoramic image efficiently.

Figure 4:
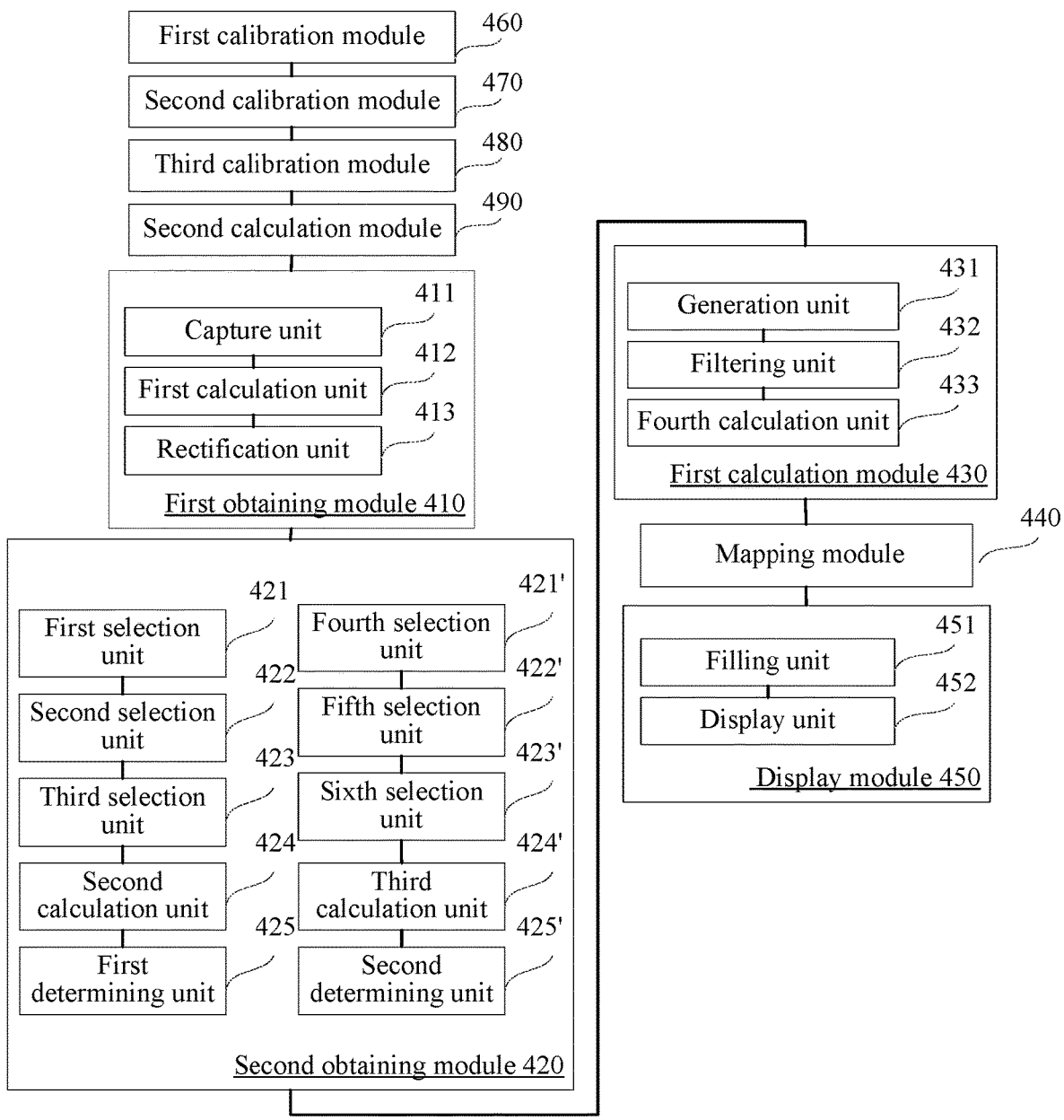
FIG. 4 is a block diagram of an apparatus for obtaining a binocular panoramic image according to another exemplary embodiment.

FIG. 4 is a block diagram of an apparatus for obtaining a binocular panoramic image according to another exemplary embodiment. The apparatus for obtaining a binocular panoramic image is mainly applied to an electronic device. The electronic device herein generally may include two panoramic cameras of the same type that are disposed horizontally, and have image processing and display functions. The electronic device processes and displays images captured by the panoramic cameras. Apparently, the apparatus for obtaining a binocular panoramic image may also be applied to a system. The system includes two panoramic cameras of the same type that are disposed horizontally, and an electronic device having image processing and display functions. In this case, the panoramic cameras transmit captured image information to the electronic device for image processing and display. As shown in FIG. 4, the apparatus for obtaining a binocular panoramic image includes, but is not limited to: a first obtaining module 410, a second obtaining module 420, a first calculation module 430, a mapping module 440 and a display module 450.

The first obtaining module 410 is configured to obtain a first panoramic image acquired by a first panoramic camera and a second panoramic image acquired by a second panoramic camera.

The second obtaining module 420 is configured to obtain at least one group of a first pixel and a second pixel that match each other.

The first pixel is a pixel located in the first panoramic image obtained by the first obtaining module 410, the second pixel is a pixel located in the second panoramic image obtained by the first obtaining module 410, and for the first pixel and the second pixel that match each other, pixel values of the first pixel and adjacent pixels thereof and pixel values of the second pixel and adjacent pixels thereof meet a preset condition The first calculation module 430 is configured to calculate a distance between the matching first pixel and second pixel in the at least one group obtained by the second obtaining module 420, and obtain depth information of the first panoramic image and depth information of the second panoramic image according to the distance between the first pixel and the second pixel, where the depth information is used for representing a distance between an object and a camera, and the distance between the first pixel and the second pixel is a distance from the second pixel to a pixel that is in the second panoramic image and that corresponds to a position of the first pixel.

The mapping module 440 is configured to obtain a second monocular panoramic image through mapping by using one of the first panoramic image and the second panoramic image obtained by the first obtaining module 410 as a first monocular panoramic image, in combination with the depth information which is calculated by the first calculation module 430 and corresponding to the panoramic image used as the first monocular panoramic image, the first monocular panoramic image and a preset pupil distance between a first eye and a second eye.

The display module 450 is configured to display the first monocular panoramic image in a first display region corresponding to the first eye, and display, in a display region corresponding to a second eye, the second monocular panoramic image obtained by the mapping module 440 through mapping.

Optionally, the apparatus for obtaining a binocular panoramic image may further include a first calibration module 460, a second calibration module 470, a third calibration module 480 and a second calculation module 490.

The first calibration module 460 is configured to perform monocular calibration on the first panoramic camera, to determine a first internal parameter of the first panoramic camera and a first external parameter with respect to a real-world coordinate system.

The second calibration module 470 is configured to perform monocular calibration on the second panoramic camera, to determine a second internal parameter of the second panoramic camera and a second external parameter with respect to the real-world coordinate system.

The third calibration module 480 is configured to perform stereo calibration on the first panoramic camera and the second panoramic camera.

In the stereo calibration herein, a relative position parameter between the first panoramic camera and the second panoramic camera is determined according to the first internal parameter determined by the first calibration module 460, the first external parameter determined by the first calibration module 460, the second internal parameter determined by the second calibration module 470 and the second external parameter determined by the second calibration module 470.

The second calculation module 490 is configured to calculate a rotation matrix and a translation matrix of the first panoramic camera and the second panoramic camera according to the parameters obtained through the monocular calibration and the stereo calibration.

Optionally, the first obtaining module 410 includes: a capture unit 411, a first calculation unit 412, and a calibration unit 413.

The capture unit 411 is configured to capture a first initial panoramic image by using the first panoramic camera, and capture a second initial panoramic image by using the second panoramic camera at the same time.

The first calculation unit 412 is configured to calculate, according to the rotation matrix and the translation matrix, a first mapping table of the first initial panoramic image captured by the capture unit 411 and a second mapping table of the second initial panoramic image captured by the capture unit 411.

Herein, the first mapping table stores a correspondence between coordinates of each pixel in the first initial panoramic image before and after transformation based on the rotation matrix and the translation matrix, and the second mapping table stores a correspondence between coordinates of each pixel in the second initial panoramic image before and after transformation based on the rotation matrix and the translation matrix.

The calibration unit 413 is configured to rectify the first initial panoramic image by searching the first mapping table calculated by the first calculation unit 412, to obtain the first panoramic image, and rectify the second initial panoramic image by searching the second mapping table calculated by the first calculation unit 412, to obtain the second panoramic image, where matching pixels in the first panoramic image obtained after the rectification and the second panoramic image obtained after the rectification are on the same horizontal axis.

Optionally, the second obtaining module 420 includes: a first selection unit 421, a second selection unit 422, a third selection unit 423, a second calculation unit 424 and a first determining unit 425.

The first selection unit 421 is configured to: for any first pixel in the first panoramic image, select, in the second panoramic image, a pixel at a position corresponding to the first pixel, and determine pixels in a first predetermined region including the selected pixel as candidate pixels.

The second selection unit 422 is configured to select, in the first panoramic image, a first region of a predetermined size by using the first pixel as a center.

The third selection unit 423 is configured to: for each candidate pixel selected by the first selection unit 421, select, in the second panoramic image, a second region of a predetermined size by using the candidate pixel as a center.

The second calculation unit 424 is configured to: for each second region, calculate pixel differences between pixels in the second region and pixels at corresponding positions in the first region selected by the second selection unit 422, and summate absolute values of the pixel differences.

The first determining unit 425 is configured to determine a candidate pixel corresponding to a second region with a minimum sum of absolute values, which is calculated by the second calculation unit 424, as the second pixel corresponding to the first pixel.

Optionally, the second obtaining module 420 is further configured to:

for each determined group of the first pixel and the second pixel in the second panoramic image, determine a pixel in the first panoramic image having a highest matching degree with the second pixel, and when the pixel in the first panoramic image having the highest matching degree with the second pixel is the first pixel, store the first pixel and the second pixel as a group of first and second pixels that match each other.

Optionally, the second obtaining module 420 further includes: a fourth selection unit 421', a fifth selection unit 422', a sixth selection unit 423', a third calculation unit 424' and a second determining unit 425'.

The fourth selection unit 421' is configured to: for any first pixel in the first panoramic image, select, in the second panoramic image, a pixel at a position corresponding to the first pixel, and determine pixels in a second predetermined region including the selected pixel as candidate pixels.

The fifth selection unit 422' is configured to select, in the first panoramic image, a first line segment with a predetermined length in a predetermined direction by using the first pixel as a center.

The sixth selection unit 423' is configured to: for each candidate pixel selected by the fourth selection unit 421', select, in the second panoramic image, a second line segment with the predetermined length in the predetermined direction by using the candidate pixel as a center.

The third calculation unit 424' is configured to: for each second line segment, calculate pixel differences between pixels on the second line segment and pixels at corresponding positions on the first line segment selected by the fifth selection unit 422', and summate absolute values of the pixel differences.

The second determining unit 425' is configured to determine a candidate pixel corresponding to a second line segment with a minimum sum of absolute values, which is calculated by the third calculation unit 424', as the second pixel matching the first pixel.

Optionally, the first calculation module 430 includes: a generation unit 431, a filtering unit 432 and a fourth calculation unit 433.

The generation unit 431 is configured to generate a disparity map according to the calculated distance between the first and second pixels in each group.

The filtering unit 432 is configured to denoise, by using a filter, the disparity map generated by the generation unit 431, to obtain a denoised disparity map.

The fourth calculation unit 433 is configured to calculate depth information of each group of matching pixels according to the disparity map denoised by the filtering unit 432.

Optionally, the display module 450 includes: a filling unit 451 and a display unit 452.

The filling unit 451 is configured to perform hole filling processing on the second monocular panoramic image in a predetermined manner.

The hole filling herein is used for filling a hole that is generated due to image rotation or shielding during mapping.

The display unit 452 is configured to display, in the display region corresponding to the second eye, the second monocular panoramic image after the hole filling processing performed by the filling unit 451.

In conclusion, in the apparatus for obtaining a binocular panoramic image provided in this embodiment of the present disclosure, a first panoramic image and a second panoramic image are acquired by using two horizontally disposed panoramic cameras; depth information is calculated according to a distance between matching pixels in the first panoramic image and the second panoramic image; a second monocular panoramic image is obtained through mapping by using one of the panoramic images as a first monocular panoramic image, in combination with the first monocular panoramic image, the corresponding depth information and a preset pupil distance between a first eye and a second eye, thereby obtaining a binocular stereo panoramic image. The depth information is rapidly calculated by using two panoramic images, and the second monocular panoramic image is obtained through mapping. In the process, it is unnecessary to unfold images and stitch the images into a binocular stereo panoramic image, avoiding image distortion during unfolding, reserving pixels of the original images, resolving the technical problems in the prior art that it takes a long time to obtain a binocular stereo panoramic image through image stitching and the obtained image is of low quality, and achieving an effect of obtaining a high-quality binocular stereo panoramic image efficiently.

In addition, related parameters of the panoramic cameras are obtained through calibration. A rotation matrix and a translation matrix are calculated by using the parameters, so that the first panoramic image and the second panoramic image can be rectified subsequently by using the rotation matrix and the translation matrix.

In addition, coordinates of pixels in an image before and after transformation are calculated by using the rotation matrix and the translation matrix, and a correspondence between coordinates before and after transformation is stored in a mapping table. The first panoramic image and the second panoramic image are rectified by searching mapping tables, so that matching pixels after rectification are on the same horizontal axis. Therefore, matching pixels can be found rapidly in the subsequent step, and depth information calculated by using a distance between pixels with a high matching degree is used for mapping, accelerating the speed of obtaining a binocular panoramic image.

In addition, candidate pixels in a predetermined range around a position corresponding to the first pixel are selected in the second panoramic image, and degrees of similarity between the candidate pixels and pixels in a region surrounding the first pixel are calculated, to determine a matching pixel. Pixels interfering with the matching result are eliminated by calculating the degrees of similarity between surrounding pixels, so that the pixel obtained through matching is more accurate.

In addition, reverse matching is performed on the determined matching pixel. A matching pixel determined in the second panoramic image according to the first pixel is a second pixel, and then it is determined whether a matching point found in the first panoramic image according to the second pixel is the first pixel. The determined matching point is more accurate through two matching verifications.

In addition, pixels on a predetermined line segment are used as candidate pixels for calculating similarity degrees, so that less data is selected during calculation, thereby accelerating the calculation process.

In addition, a filter is used for denoising a disparity map, to reduce impact on the disparity map caused by erroneously calculated points in the disparity map, so that the obtained disparity map becomes smoother.

In addition, holes in the second monocular panoramic image that are generated due to image rotation or shielding during mapping are filled, thereby improving image quality of the second monocular panoramic image.

It should be noted that, when the apparatus for obtaining a binocular panoramic image according to the foregoing embodiment obtains a binocular panoramic image, division of the functional modules is only used as an example for description. In actual application, the foregoing functions may be allocated to and implemented by different functional modules according to requirements, that is, an internal structure of a terminal device is divided into different functional modules to implement all or some of the functions described above. In addition, the apparatus for obtaining a binocular panoramic image according to the foregoing embodiment belongs to the same idea of the embodiment of the method for obtaining a binocular panoramic image. For a specific implementation process of the apparatus, refer to the method embodiment. Details are not described herein again.

Figure 5:
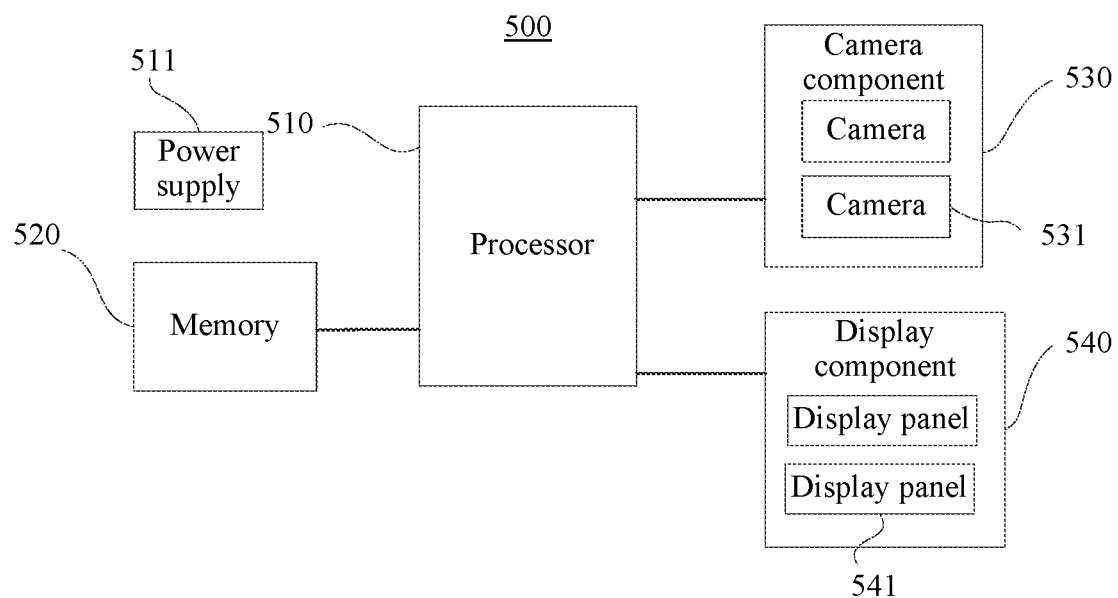
FIG. 5 is a block diagram of an apparatus configured to obtain a binocular panoramic image according to an exemplary embodiment.

FIG. 5 is a block diagram of an electronic apparatus configured to obtain a binocular panoramic image according to an exemplary embodiment. Referring to FIG. 5, FIG. 5 shows a structural block diagram of an apparatus for obtaining a binocular panoramic image according to some embodiments of the present disclosure. The electronic apparatus 500 is configured to implement the method for obtaining a binocular panoramic image provided in the foregoing embodiment. The electronic apparatus 500 in the present disclosure may include: a processor 510, a memory 520, a camera component 530, and a display component 540.

The processor 510 an arithmetic logic component, a register component, a control component, and so on. The processor 510 may be an independent central processor, a graphical processor, or an embedded processor, such as a microprocessor unit (MPU), a microcontroller unit (MCU), or an embedded digital signal processor (EDSP).

The memory 520 may be configured to store software programs and modules. The processor 510 executes various functional applications and data processing of the electronic apparatus 500 by running the software programs and modules stored in the memory 520. The memory 520 may mainly include a program storage area and a data storage area. The program storage area may store an application program required by at least one function (such as an image display function), and the like. The data storage area may store data (such as a mapping table, a disparity map, and a depth map) created according to use of the electronic apparatus 500, and the like. In addition, the memory 520 may include a high speed random access memory, and may further include a non-volatile memory, such as at least one magnetic disk storage device, a flash memory, or other volatile solid-state storage devices.

The camera component 530 includes two cameras 531 for capturing annular panoramic images. Each camera 531 generally consists of a lens, an image sensor, an interface, a digital signal processor, a display screen, and the like. The lens is fixed above the image sensor, and the focal length can be changed by manually adjusting the lens. The image sensor is equivalent to the film in a traditional camera, and is the heart for image capture of the camera. The interface is configured to connect the cameras to a main board of an electronic device by using a wire, a board-to-board connector, or a spring, and send captured images to the memory 520. The digital signal processor processes the captured images through arithmetical operation, to convert the captured analog images into digital images, and sends the digital images to the memory 520 through the interface.

The display component 540 may include display screen apparatuses used by various fixed-type, handheld, or wearable devices, for example, a liquid crystal display screen, a touch liquid crystal display screen, a transmission projection display screen based on an optical principle. Alternatively, the display component 540 may also be a transmission display apparatus based on a video synthesis technology. For example, in virtual reality glasses, lenses of the glasses are made of display screen apparatuses, and the binocular panoramic image is displayed on corresponding lenses according to corresponding display regions. Generally, two display panels 541 are needed in the electronic apparatus 500 to display the binocular panoramic image simultaneously.

The electronic apparatus 500 further includes a power supply 511 (such as a battery) for supplying power to the components. Preferably, the power supply may be logically connected to the processor 510 by using a power management system, thereby implementing functions such as charging, discharging and power consumption management by using the power management system.

Optionally, a structure body for fastening the display component 540 may further be added on the electronic apparatus 500. For example, a helmet may be added based on the virtual reality glasses, to fasten the lenses at corresponding positions on the helmet, to form a virtual reality helmet.

It should be additionally noted that, unless otherwise specified, the technical terms or scientific terms used herein should be in line with the ordinary meaning as understood by persons of ordinary skill in the art. Terms such as "first" and "second" used in the specification and claims of the present disclosure application do not represent any sequence, quantity, or importance, but are only used for differentiating different components. Likewise, terms such as "a" or "one" do not represent the limitation on quantity, but represent the presence of at least one. Terms such as "connect" or "link" do not necessarily mean a physical or mechanical connection, but can include an electrical connection, no matter the connection is direct or indirect. Terms such as "upper", "lower", "left" and "right" are merely used for representing a relative position relationship. When an absolute position of a described object changes, the relative position relationship changes correspondingly The sequence numbers of the preceding embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a non-transitory computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for obtaining a binocular panoramic image performed at an electronic apparatus having one or more processors and memory storing instructions to be executed by the one or more processors, comprising:
   obtaining, by the electronic apparatus, a first panoramic image acquired by a first panoramic camera and a second panoramic image acquired by a second panoramic camera, wherein the first panoramic camera and the second panoramic camera are both horizontally disposed, the first panoramic image has multiple pixels, and the second panoramic image has multiple pixels;
   obtaining, by the electronic apparatus, at least one group of a first pixel and a second pixel that match each other, wherein the first pixel is a pixel located in the first panoramic image, the second pixel is a pixel located in the second panoramic image, and for the first pixel and the second pixel that match each other, pixel values of the first pixel and adjacent pixels thereof and pixel values of the second pixel and adjacent pixels thereof meet a preset condition;
   calculating, by the electronic apparatus, a distance between the matching first pixel and second pixel in the at least one group, wherein the distance between the first pixel and the second pixel is a distance from the second pixel to a pixel that is in the second panoramic image and that corresponds to a position of the first pixel;
   obtaining, by the electronic apparatus, depth information of the first panoramic image and depth information of the second panoramic image according to the distance between the first pixel and the second pixel;
   obtaining, by the electronic apparatus, a second monocular panoramic image through mapping by choosing one of the first panoramic image and the second panoramic image as a first monocular panoramic image, in combination with the depth information of a corresponding panoramic image used as the first monocular panoramic image, the first monocular panoramic image and a preset pupil distance between a first eye and a second eye; and
   displaying, by the electronic apparatus, the first monocular panoramic image in a first display region corresponding to the first eye, and displaying the second monocular panoramic image in a second display region corresponding to the second eye.

2. The method according to claim 1, further comprising:
   performing, by the electronic apparatus, monocular calibration on the first panoramic camera, to determine a first internal parameter of the first panoramic camera and a first external parameter with respect to a real-world coordinate system;
   performing, by the electronic apparatus, monocular calibration on the second panoramic camera, to determine a second internal parameter of the second panoramic camera and a second external parameter with respect to the real-world coordinate system;
   performing, by the electronic apparatus, stereo calibration on the first panoramic camera and the second panoramic camera, wherein a relative position parameter between the first panoramic camera and the second panoramic camera is determined in the stereo calibration according to the first internal parameter, the first external parameter, the second internal parameter and the second external parameter; and
   calculating, by the electronic apparatus, a rotation matrix and a translation matrix of the first panoramic camera and the second panoramic camera according to the parameters obtained through the monocular calibration and the stereo calibration.

3. The method according to claim 2, wherein the obtaining a first panoramic image acquired by a first panoramic camera and a second panoramic image acquired by a second panoramic camera comprises:
   capturing a first initial panoramic image by using the first panoramic camera, and capturing a second initial panoramic image by using the second panoramic camera at the same time;
   calculating a first mapping table of the first initial panoramic image and a second mapping table of the second initial panoramic image according to the rotation matrix and the translation matrix, wherein the first mapping table stores a correspondence between coordinates of each pixel in the first initial panoramic image before and after transformation based on the rotation matrix and the translation matrix, and the second mapping table stores a correspondence between coordinates of each pixel in the second initial panoramic image before and after transformation based on the rotation matrix and the translation matrix; and rectifying the first initial panoramic image according to the first mapping table, to obtain the first panoramic image, and rectifying the second initial panoramic image according to the second mapping table, to obtain the second panoramic image, wherein matching pixels in the first panoramic image obtained after the rectification and the second panoramic image obtained after the rectification are on the same horizontal axis.

4. The method according to claim 1, wherein the obtaining at least one group of a first pixel and a second pixel that match each other comprises:

for any first pixel in the first panoramic image, selecting, in the second panoramic image, a pixel at a position corresponding to the first pixel, and determining pixels in a first predetermined region comprising the selected pixel as candidate pixels;

selecting, in the first panoramic image, a first region of a predetermined size by using the first pixel as a center;

for each candidate pixel in the second panoramic image, selecting a second region of a predetermined size by using the candidate pixel as a center;

for each second region, calculating pixel differences between pixels in the second region and pixels at corresponding positions in the first region, and a sum of absolute values of the pixel differences; and determining a candidate pixel corresponding to a second region with a minimum sum of absolute values as the second pixel corresponding to the first pixel.

5. The method according to claim 4, wherein after the determining a candidate pixel corresponding to a second region with a minimum sum of absolute values as the second pixel corresponding to the first pixel, the method further comprises:

for each determined group of the first pixel and the second pixel in the second panoramic image, determining, by the electronic apparatus, a pixel in the first panoramic image having a highest matching degree with the second pixel, and when the pixel in the first panoramic image having the highest matching degree with the second pixel is the first pixel, storing the first pixel and the second pixel as a group of first and second pixels that match each other.

6. The method according to claim 1, wherein the obtaining at least one group of a first pixel and a second pixel that match each other comprises:

for any first pixel in the first panoramic image, selecting, in the second panoramic image, a pixel at a position corresponding to the first pixel, and determining pixels in a second predetermined region comprising the selected pixel as candidate pixels;

selecting, in the first panoramic image, a first line segment with a predetermined length in a predetermined direction by using the first pixel as a center;

for each candidate pixel in the second panoramic image, selecting a second line segment with the predetermined length in the predetermined direction by using the candidate pixel as a center;

for each second line segment, calculating pixel differences between pixels on the second line segment and pixels at corresponding positions on the first line segment, and a sum of absolute values of the pixel differences; and determining a candidate pixel corresponding to a second line segment with a minimum sum of absolute values as the second pixel matching the first pixel.

7. The method according to claim 1, wherein the calculating a distance between the matching first pixel and second pixel in the at least one group comprises:

generating a disparity map according to the calculated distance between the first and second pixels in each group;

denoising the disparity map by using a filter, to obtain a denoised disparity map; and calculating depth information of each group of matching pixels according to the denoised disparity map.

8. The method according to claim 1, wherein the displaying, by the electronic apparatus, the second monocular panoramic image in a second display region corresponding to the second eye comprises:

performing, by the electronic apparatus, hole filling processing on the second monocular panoramic image in a predetermined manner, wherein the hole filling is used for filling a hole that is generated due to image rotation or shielding during mapping; and displaying, by the electronic apparatus, the second monocular panoramic image after the hole filling processing in the display region corresponding to the second eye.

9. An electronic apparatus having one or more processors and memory coupled to the one or more processors and a plurality of instructions stored in the memory that, when executed by the one or more processors, cause the electronic apparatus to perform the following operations:

obtaining a first panoramic image acquired by a first panoramic camera and a second panoramic image acquired by a second panoramic camera, wherein the first panoramic camera and the second panoramic camera are both horizontally disposed, the first panoramic image has multiple pixels, and the second panoramic image has multiple pixels;

obtaining at least one group of a first pixel and a second pixel that match each other, wherein the first pixel is a pixel located in the first panoramic image, the second pixel is a pixel located in the second panoramic image, and for the first pixel and the second pixel that match each other, pixel values of the first pixel and adjacent pixels thereof and pixel values of the second pixel and adjacent pixels thereof meet a preset condition;

calculating a distance between the matching first pixel and second pixel in the at least one group, wherein the distance between the first pixel and the second pixel is a distance from the second pixel to a pixel that is in the second panoramic image and that corresponds to a position of the first pixel;

obtaining depth information of the first panoramic image and depth information of the second panoramic image according to the distance between the first pixel and the second pixel;

obtaining a second monocular panoramic image through mapping by choosing one of the first panoramic image and the second panoramic image as a first monocular panoramic image, in combination with the depth information of a corresponding panoramic image used as the first monocular panoramic image, the first monocular panoramic image and a preset pupil distance between a first eye and a second eye; and displaying the first monocular panoramic image in a first display region corresponding to the first eye, and displaying the second monocular panoramic image in a second display region corresponding to the second eye.

10. The electronic apparatus according to claim 9, wherein the operations further comprise:

performing monocular calibration on the first panoramic camera, to determine a first internal parameter of the first panoramic camera and a first external parameter with respect to a real-world coordinate system;

performing monocular calibration on the second panoramic camera, to determine a second internal parameter of the second panoramic camera and a second external parameter with respect to the real-world coordinate system;

performing stereo calibration on the first panoramic camera and the second panoramic camera, wherein a relative position parameter between the first panoramic camera and the second panoramic camera is determined in the stereo calibration according to the first internal parameter, the first external parameter, the second internal parameter and the second external parameter; and calculating a rotation matrix and a translation matrix of the first panoramic camera and the second panoramic camera according to the parameters obtained through the monocular calibration and the stereo calibration.

11. The electronic apparatus according to claim 10, wherein the operation of obtaining a first panoramic image acquired by a first panoramic camera and a second panoramic image acquired by a second panoramic camera comprises:

capturing a first initial panoramic image by using the first panoramic camera, and capturing a second initial panoramic image by using the second panoramic camera at the same time;

calculating a first mapping table of the first initial panoramic image and a second mapping table of the second initial panoramic image according to the rotation matrix and the translation matrix, wherein the first mapping table stores a correspondence between coordinates of each pixel in the first initial panoramic image before and after transformation based on the rotation matrix and the translation matrix, and the second mapping table stores a correspondence between coordinates of each pixel in the second initial panoramic image before and after transformation based on the rotation matrix and the translation matrix; and rectifying the first initial panoramic image according to the first mapping table, to obtain the first panoramic image, and rectifying the second initial panoramic image according to the second mapping table, to obtain the second panoramic image, wherein matching pixels in the first panoramic image obtained after the rectification and the second panoramic image obtained after the rectification are on the same horizontal axis.

12. The electronic apparatus according to claim 9, wherein the operation of obtaining at least one group of a first pixel and a second pixel that match each other comprises:

for any first pixel in the first panoramic image, selecting, in the second panoramic image, a pixel at a position corresponding to the first pixel, and determining pixels in a first predetermined region comprising the selected pixel as candidate pixels;

selecting, in the first panoramic image, a first region of a predetermined size by using the first pixel as a center;

for each candidate pixel in the second panoramic image, selecting a second region of a predetermined size by using the candidate pixel as a center;

for each second region, calculating pixel differences between pixels in the second region and pixels at corresponding positions in the first region, and a sum of absolute values of the pixel differences; and determining a candidate pixel corresponding to a second region with a minimum sum of absolute values as the second pixel corresponding to the first pixel.

13. The electronic apparatus according to claim 9, wherein the operation of obtaining at least one group of a first pixel and a second pixel that match each other comprises:

for any first pixel in the first panoramic image, selecting, in the second panoramic image, a pixel at a position corresponding to the first pixel, and determining pixels in a second predetermined region comprising the selected pixel as candidate pixels;

selecting, in the first panoramic image, a first line segment with a predetermined length in a predetermined direction by using the first pixel as a center;

for each candidate pixel in the second panoramic image, selecting a second line segment with the predetermined length in the predetermined direction by using the candidate pixel as a center;

for each second line segment, calculating pixel differences between pixels on the second line segment and pixels at corresponding positions on the first line segment, and a sum of absolute values of the pixel differences; and determining a candidate pixel corresponding to a second line segment with a minimum sum of absolute values as the second pixel matching the first pixel.

14. The electronic apparatus according to claim 9, wherein the operation of calculating a distance between the matching first pixel and second pixel in the at least one group comprises:

generating a disparity map according to the calculated distance between the first and second pixels in each group;

denoising the disparity map by using a filter, to obtain a denoised disparity map; and calculating depth information of each group of matching pixels according to the denoised disparity map.

15. The electronic apparatus according to claim 9, wherein the operation of displaying, by the electronic apparatus, the second monocular panoramic image in a second display region corresponding to the second eye comprises:

performing hole filling processing on the second monocular panoramic image in a predetermined manner, wherein the hole filling is used for filling a hole that is generated due to image rotation or shielding during mapping; and displaying the second monocular panoramic image after the hole filling processing in the display region corresponding to the second eye.

16. A non-transitory computer readable storage medium storing a plurality of instructions in connection with an electronic apparatus having one or more processors, wherein the plurality of instructions, when executed by the one or more processors, cause the electronic apparatus to perform the following operations:

obtaining a first panoramic image acquired by a first panoramic camera and a second panoramic image acquired by a second panoramic camera, wherein the first panoramic camera and the second panoramic camera are both horizontally disposed, the first panoramic image has multiple pixels, and the second panoramic image has multiple pixels;

obtaining at least one group of a first pixel and a second pixel that match each other, wherein the first pixel is a pixel located in the first panoramic image, the second pixel is a pixel located in the second panoramic image, and for the first pixel and the second pixel that match each other, pixel values of the first pixel and adjacent pixels thereof and pixel values of the second pixel and adjacent pixels thereof meet a preset condition;

calculating a distance between the matching first pixel and second pixel in the at least one group, wherein the distance between the first pixel and the second pixel is a distance from the second pixel to a pixel that is in the second panoramic image and that corresponds to a position of the first pixel;

obtaining depth information of the first panoramic image and depth information of the second panoramic image according to the distance between the first pixel and the second pixel;

obtaining a second monocular panoramic image through mapping by choosing one of the first panoramic image and the second panoramic image as a first monocular panoramic image, in combination with the depth information of a corresponding panoramic image used as the first monocular panoramic image, the first monocular panoramic image and a preset pupil distance between a first eye and a second eye; and displaying the first monocular panoramic image in a first display region corresponding to the first eye, and displaying the second monocular panoramic image in a second display region corresponding to the second eye.

17. The non-transitory computer readable storage medium according to claim 16, wherein the operations further comprise:

performing monocular calibration on the first panoramic camera, to determine a first internal parameter of the first panoramic camera and a first external parameter with respect to a real-world coordinate system;

performing monocular calibration on the second panoramic camera, to determine a second internal parameter of the second panoramic camera and a second external parameter with respect to the real-world coordinate system;

performing stereo calibration on the first panoramic camera and the second panoramic camera, wherein a relative position parameter between the first panoramic camera and the second panoramic camera is determined in the stereo calibration according to the first internal parameter, the first external parameter, the second internal parameter and the second external parameter; and calculating a rotation matrix and a translation matrix of the first panoramic camera and the second panoramic camera according to the parameters obtained through the monocular calibration and the stereo calibration.

18. The non-transitory computer readable storage medium according to claim 16, wherein the operation of obtaining at least one group of a first pixel and a second pixel that match each other comprises:

for any first pixel in the first panoramic image, selecting, in the second panoramic image, a pixel at a position corresponding to the first pixel, and determining pixels in a first predetermined region comprising the selected pixel as candidate pixels;

selecting, in the first panoramic image, a first region of a predetermined size by using the first pixel as a center;

for each candidate pixel in the second panoramic image, selecting a second region of a predetermined size by using the candidate pixel as a center;

for each second region, calculating pixel differences between pixels in the second region and pixels at corresponding positions in the first region, and a sum of absolute values of the pixel differences; and determining a candidate pixel corresponding to a second region with a minimum sum of absolute values as the second pixel corresponding to the first pixel.

19. The non-transitory computer readable storage medium according to claim 16, wherein the operation of obtaining at least one group of a first pixel and a second pixel that match each other comprises:

for any first pixel in the first panoramic image, selecting, in the second panoramic image, a pixel at a position corresponding to the first pixel, and determining pixels in a second predetermined region comprising the selected pixel as candidate pixels;

selecting, in the first panoramic image, a first line segment with a predetermined length in a predetermined direction by using the first pixel as a center;

for each candidate pixel in the second panoramic image, selecting a second line segment with the predetermined length in the predetermined direction by using the candidate pixel as a center;

for each second line segment, calculating pixel differences between pixels on the second line segment and pixels at corresponding positions on the first line segment, and a sum of absolute values of the pixel differences; and determining a candidate pixel corresponding to a second line segment with a minimum sum of absolute values as the second pixel matching the first pixel.

20. The non-transitory computer readable storage medium according to claim 16, wherein the operation of calculating a distance between the matching first pixel and second pixel in the at least one group comprises:

generating a disparity map according to the calculated distance between the first and second pixels in each group;

denoising the disparity map by using a filter, to obtain a denoised disparity map; and calculating depth information of each group of matching pixels according to the denoised disparity map.

* * * * *